(12) United States Patent
Schneider (10) Patent No.: US 7,711,921 B2
(45) Date of Patent: May 4, 2010

(54) PAGE ORIENTED MEMORY MANAGEMENT

(75) Inventor: James P. Schneider, Raleigh, NC (US)

(73) Assignee: Red Hat, Inc,, Raleigh, NC (US)

( * ) Notice: Subject to any disclaimer, the term of this patent is extended or adjusted under 35 U.S.C. 154(b) by 395 days.

(21) Appl. No.: 11/713,058

(22) Filed: Feb. 28, 2007

(65) Prior Publication Data
US 2008/0209153 A1    Aug. 28, 2008

(51) Int. Cl.
G06F 12/00    (2006.01)
(52) U.S. Cl. .................... 711/170; 711/112
(58) Field of Classification Search ........... 711/112, 711/114, 170, 171, 172, 173; 707/201, 205
See application file for complete search history.

(56) References Cited

U.S. PATENT DOCUMENTS 5,835,959 A * 11/1998 McCool et al. ............. 711/171
7,197,598 B2 * 3/2007 Kim et al. .................. 711/114
7,249,152 B2 * 7/2007 Muthulingam et al. ...... 707/205
7,506,317 B2 * 3/2009 Liang et al. ................ 711/170
2008/0077590 A1 * 3/2008 Pandit ......................... 707/8

OTHER PUBLICATIONS

"Arena Virtual Memory Manager Dec 19, 2002", http://geocities.com/malbrain/arena2_c.html?200728, Feb. 28, 2007, 10 pages.
Wilson, Paul, et al., "Dynamic Storage Allocation: A Survey and Critical Review", Department of Computer Sciences, University of Texas at Austin, 1995, 78 pages.

* cited by examiner

Primary Examiner—Pierre-Michel Bataille
(74) Attorney, Agent, or Firm—Blakely, Sokoloff, Taylor & Zafman LLP (57) ABSTRACT

A method and apparatus for managing memory allocation using memory pages. One or more arenas are designated within a memory page. Each of the arenas are divided into one or more memory blocks of the same size. Metadata is generated for the memory blocks at a location other than between the memory blocks, which is used when allocating memory to satisfy an allocation request of the size of the memory blocks.

23 Claims, 8 Drawing Sheets

PAGE ORIENTED MEMORY MANAGEMENT

TECHNICAL FIELD

Embodiments of the present invention relate to memory management, and more particularly, to page oriented memory management.

BACKGROUND

A component included in all computing devices is memory. A device's main memory (e.g., RAM, flash, etc.) provides storage that can be quickly written to and read from by a processor. Main memory is allocated to an operating system and programs during runtime (throughout the duration of execution). When a program terminates, memory allocated to that program is freed (de-allocated), and may subsequently be allocated to a different program.

There are multiple conventional memory allocation schemes by which memory can be allocated and de-allocated. One standard conventional memory allocation scheme is heap memory allocation.

Figure 1:
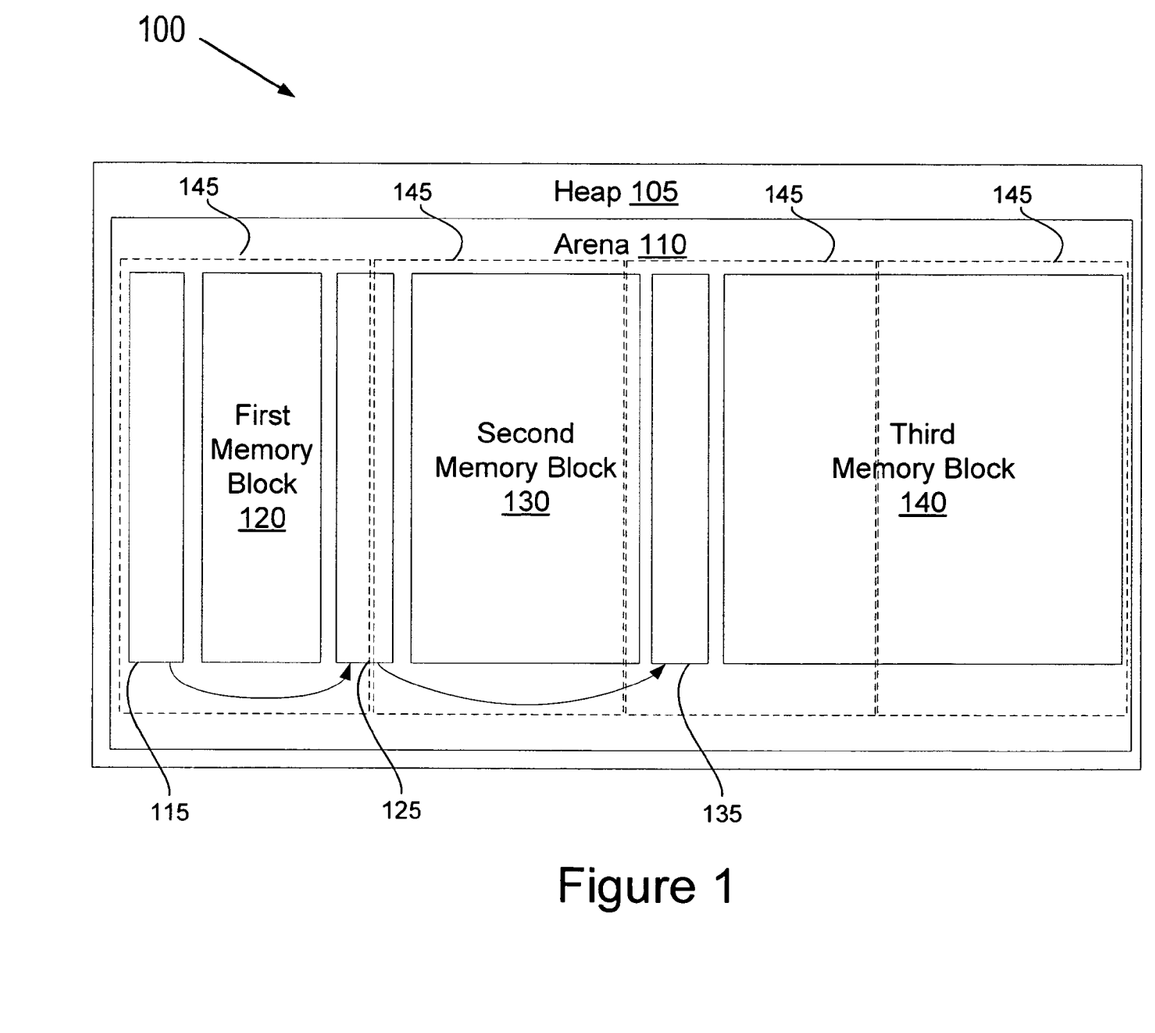
FIG. 1 illustrates a block diagram of a conventional heap-based memory allocation.

FIG. 1 illustrates a block diagram of a conventional heap-based memory allocation 100. The heap based memory allocation 100 consists of a heap 105 having a single arena 110 from which memory can be allocated. The illustrated arena 110 includes a first metadata structure 115, first memory block 120, second metadata structure 125, second memory block 130, third metadata structure 135, and third memory block 140. As illustrated, in heap based memory allocation, a memory block is always preceded by a metadata structure associated with that memory block. The metadata structure includes a header that describes the size of the associated memory block or a pointer to a subsequent metadata structure. As illustrated, first metadata structure 115 includes a pointer that points to second metadata structure 125, and second metadata structure 125 includes a pointer that points to third metadata structure 135.

To find an unallocated block of memory, metadata structures must be navigated until a metadata structure is discovered that is associated with a memory block that has sufficient capacity to satisfy an allocation request. On average, half of the unallocated metadata structures need to be examined before a suitable memory block is discovered. This can impair system performance.

When allocating memory blocks, mistakes can be made by a program that uses allocated memory such that data is written to subsequent metadata structures and/or memory blocks. This may cause portions of the subsequent metadata structures and/or memory block to be overwritten, commonly referred to as an overrun bug or buffer overrun. When subsequent metadata structures are overwritten, information about the associated memory block can be lost, and information about subsequent metadata structures can be lost. This loss of information may cause a program to crash the next time a memory allocation or de-allocation request is made.

When a memory allocation is requested, but there are not sufficient available memory blocks, memory blocks may be freed by moving data from the main memory to secondary memory (e.g., to a hard disk) in a process referred to as paging. For paging to operate, main memory is divided into a series of equally sized memory pages 145. The size of the memory pages 145 depends on the architecture on which the main memory is located. For example, in the x86 architecture of most personal computers (PCs), each memory page is 4 kilobytes (4,096 bytes). To free main memory, memory pages 145 are transferred as a unit into secondary storage (e.g., hard disk, optical storage, other magnetic media).

Referring to FIG. 1, the heap 105 includes a plurality of memory pages 145. In the conventional heap-based memory allocation, as in other conventional memory allocation schemes, there is no alignment between memory pages 145 and assigned memory blocks, data structures, or arenas. Therefore, when memory blocks are moved to secondary memory, some portions of memory blocks and/or data structures may remain in the primary memory, and other portions of these memory blocks and/or data structures may be moved to secondary memory. This may significantly impact system performance.

Many modern operating systems support the ability for multiple threads and processes to be run concurrently. However, only a single thread may actually be active at a time per processor core of a computing device. Where multiple threads are run concurrently, the operating system switches back and forth between operative threads. If an active thread is switched to inactive during memory allocation, the switch may occur after a memory block has been allocated, but before an associated data structure has been updated. If the new active thread makes a memory allocation, it may allocate the same memory block that the previously active thread allocated, since the data structure does not yet reflect the fact that the memory block has already been allocated. When the first thread next becomes active, it finishes its memory allocation and updates the data structure associated with the memory block that it had previously allocated. As a result, the data structure no longer accurately describes the size of the memory block, nor does it accurately point to the next data structure. This may cause both threads to crash.

To mitigate the above mentioned problem, conventional memory allocation schemes provide locks to guarantee that only a single thread can be allocated a specific memory block. However, conventional memory allocators must lock out an entire arena of memory during allocation to assure that appropriate memory blocks are locked. Thus, only a single thread can allocate memory at a time, causing other threads to wait, and severely impacting system performance.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for managing memory allocation using memory pages. In one embodiment, one or more arenas are designated within a memory page. Each of the arenas are divided into one or more memory blocks of the same size. The metadata is generated for the memory blocks at a location other than between the memory blocks. The metadata is then used when allocating memory to satisfy an allocation request of the size of the memory blocks.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

Figure 2:
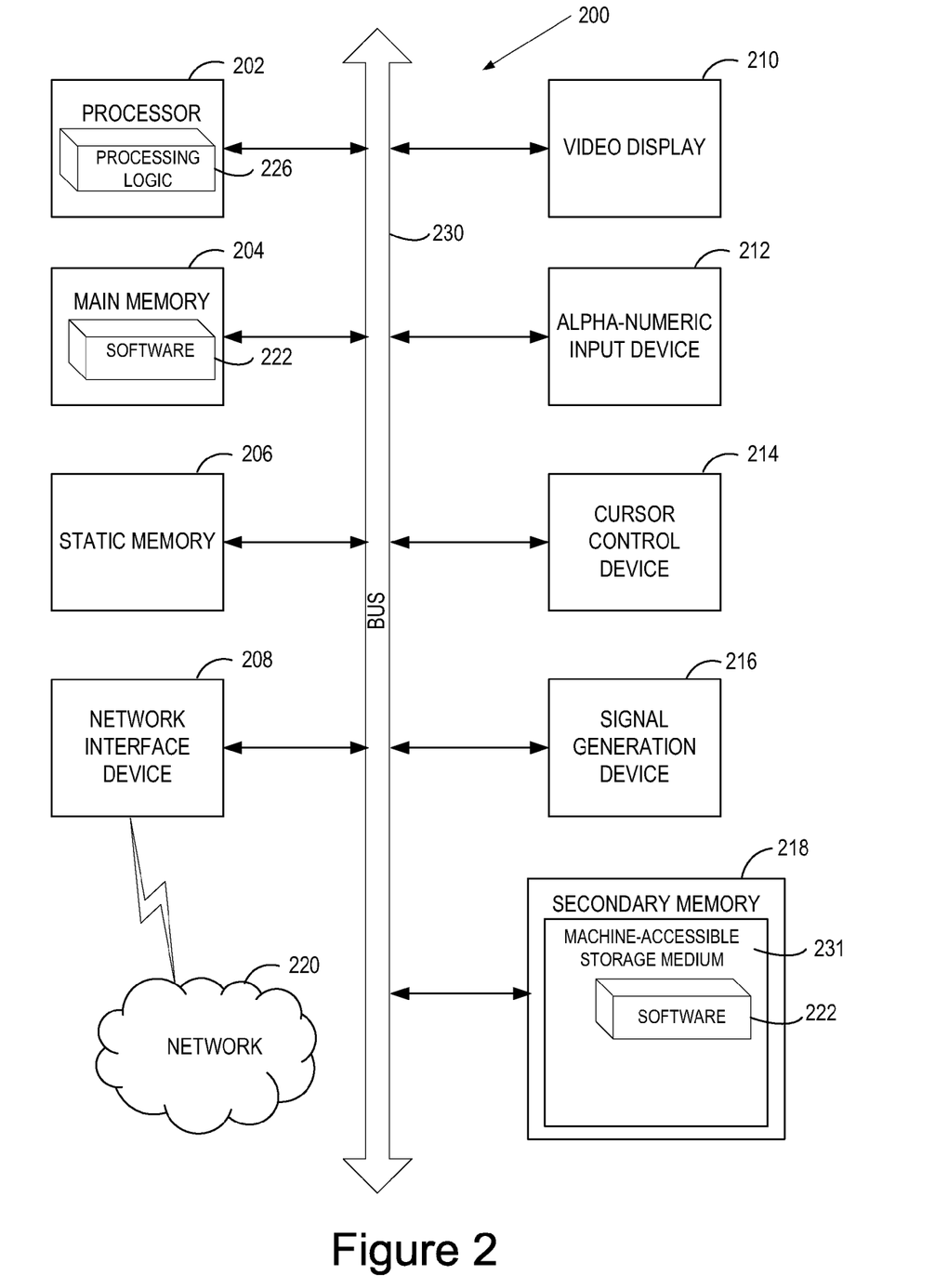
FIG. 2 illustrates a diagrammatic representation of a machine in the exemplary form of a computer system.

FIG. 2 illustrates a diagrammatic representation of a machine in the exemplary form of a computer system 200 within which a set of instructions, for causing the machine to perform any one or more of the methodologies discussed herein below, may be executed. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processing device (processor) 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a secondary memory 218 (e.g., hard disk drive, optical drive, etc.), which communicate with each other via a bus 230.

Processor 202 represents one or more general-purpose processing devices such as a microprocessor, central processing unit, or the like. More particularly, the processor 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 202 may also be one or more special-purpose processing devices such as an application specific integrated circuit (ASIC), a field programmable gate array (FPGA), a digital signal processor (DSP), network processor, or the like. The processor 202 is configured to execute the processing logic 226 for performing the operations and steps discussed herein below.

The computer system 200 may further include a network interface device 208. The computer system 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The secondary memory 218 may include a machine-accessible storage medium 231 on which is stored one or more sets of instructions (e.g., software 222) embodying any one or more of the methodologies or functions described herein. The software 222 may also reside, completely or at least partially, within the main memory 204 and/or within the processor 202 during execution thereof by the computer system 200, the main memory 204 and the processor 202 also constituting machine-accessible storage media. The software 222 may further be transmitted or received over a network 220 via the network interface device 208.

In one embodiment of the present invention, at least a portion of the main memory 204 is managed memory. Managed memory is allocated and de-allocated according to the needs of one or more applications (programs) and/or an operating system. Means for managing portions of main memory 204 may be implemented in hardware, software, or a combination thereof. The memory management means may be responsible for assigning (allocating) and freeing (de-allocating) portions of main memory 204, and/or for making calls to the general purpose memory allocation library that do so. Embodiments of the present invention may be incorporated into a general purpose memory allocation library.

While secondary memory 218 and main memory 204 are each shown in an exemplary embodiment to be single mediums, each should be taken to include a single medium or multiple media (e.g., a centralized or distributed database, and/or associated caches, registers, etc.) that store the one or more sets of instructions.

Each of the main memory 204 and the secondary memory 218 may include a machine accessible storage medium, which shall be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media.

Figure 3A:
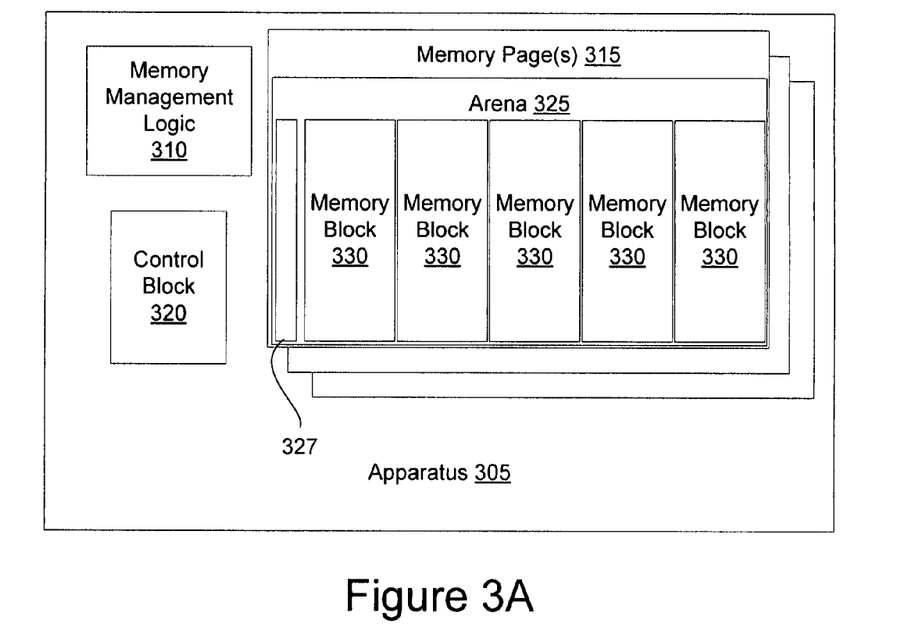
FIG. 3A illustrates a block diagram showing one embodiment of an apparatus for managing memory allocation.

FIG. 3A illustrates a block diagram of one embodiment of an apparatus 305 for managing memory allocation. The apparatus 305 may be a component of the exemplary computer system 200 of FIG. 2. The apparatus 305 may be implemented in hardware, software, or a combination thereof. In one embodiment, the apparatus 305 manages at least portions of the main memory 204 of FIG. 2.

Referring to FIG. 3A, in one embodiment, the apparatus 305 includes a memory management logic 310, a control block 320, and a plurality of memory pages 315. The memory pages 315 may be equally sized segments of memory into which a main memory is divided. Each of the memory pages 315 has a physical address and a virtual address, each of which in one embodiment include a page number and an offset into the page.

The size of the memory pages 315 may be architecture and operating system dependent. In one embodiment, each of the memory pages 315 has a size of 4 kB (4,096 bytes). Alternatively, the memory pages 315 may be 2 kB, 8 kB, 16 kB, etc., depending on the machine and/or system of which the apparatus 305 is a component.

In one embodiment, at least a portion of the memory pages 315 include an arena 325. The arena 325 is a region of memory that is managed for memory allocation. The arena 325 within each memory page may be completely bounded by the memory page. Therefore, any memory allocations made within an arena 325 will not straddle a page boundary, and thus will not span two or more different memory pages 315 (be resident on more than one memory page). This may ensure that memory blocks and data structures do not have portions that have been swapped out to secondary memory, and portions that remain in main memory. As a result, the frequency with which memory swaps occur may be reduced, and system performance may be improved.

Each arena 325 may be divided into multiple equally sized memory blocks 330, and may include a metadata structure 327. The size of the memory blocks 330 within an arena 325 may be arbitrary. Each of the memory blocks may have a size ranging from a single byte up to the size of the arena 325. In one embodiment, each of the memory blocks 330 has a size such that memory alignment constraints are satisfied (e.g., a size that is divisible by 2, 4, 8, etc, depending on the underlying system). Alternatively, memory blocks 330 may have a size that violates memory alignment constraints. Where memory blocks 330 are sized such that memory alignment constraints are violated, there may be an offset between memory blocks 330 such that each memory block begins at an address that is memory aligned (e.g., memory block begins on a 4 byte boundary).

In one embodiment, the metadata structure 327 is generated at a beginning of the arena 325, and contains all metadata necessary to manage the memory blocks 315. Such metadata may include, for example, a signature value (indicator of whether memory page is being managed), a bitmap (each bit of the bitmap corresponding to one of the memory blocks in the arena), various pointers (to find data in the memory page or data that relates to the memory page), and an offset (indicating the starting location of the first memory block in the arena). Other metadata may also be included, such as a block size value, a number of allocated blocks, a number of unallocated blocks, etc. The metadata contained in the metadata structure 327 is explained in more detail below with reference to FIG. 3B.

Referring to FIG. 3A, notably, in one embodiment, there are no metadata structures that reside between memory blocks 330. This may reduce the extent to which memory blocks 330 interact with each other. Specifically, if an overrun bug occurs when a memory block is allocated, and a subsequent memory block is overwritten, the metadata associated with the overwritten memory block is still intact. Therefore, header and pointer information regarding the overwritten memory block is not lost or modified. This may mitigate system and/or program crashes caused by a buffer overrun (overrun bug).

In one embodiment, apparatus 305 includes a control block 320. The control block 320 may be a single memory page, or multiple memory pages, that may comprise metadata. In one embodiment, the control block 320 includes an array of pointers to memory pages 315. In one embodiment, the control block 320 includes a list, each entry on the list corresponding to one of the memory pages 315 and having a value indicating the size of the memory blocks 330 on the memory page. Thereby, the control block 320 may be used to quickly determine appropriate memory pages 315 from which to allocate memory. The control block 320 may also track which of the memory pages 315 have been locked to threads, programs, and/or the operating system. In one embodiment, each entry on the control block 320 includes one or more lock parameters (e.g., read/write lock parameter, mutual exclusion lock parameter, etc.) that indicate that a memory page is locked. When a memory page is locked, only the thread to which it is locked may allocate or free memory blocks housed therein, by reading or modifying its metadata. While a memory page remains unlocked, all threads may be free to allocate memory blocks within it and to read metadata stored therein.

In one embodiment, each application run on a system has a separate memory space. The memory space is a portion of memory in which a program runs. Each memory space may include its own collection of memory pages, and a separate control block for managing the memory allocations of memory within the memory space. Alternatively, two or more applications may share a memory space. Where two or more applications share a memory space, they may share a single control block, or they may each maintain separate control blocks.

In one embodiment, the apparatus 305 includes a memory management logic 310. The memory management logic 310 allocates and frees memory in accordance with requests by applications or by an operating system. In one embodiment, the memory management logic 310 is divided into a first memory management logic that allocates memory for the operating system and a second memory management logic that allocates memory for programs and threads. The memory management logic 310 may receive requests for memory allocation, determine which of the memory pages 315 has memory blocks 330 to satisfy the request, and allocate those memory blocks 330 to the requesting thread, program, or operating system.

The memory management logic 310 may determine which memory pages 315 have memory blocks 330 sufficient to satisfy a request for allocation by first examining the control block 320. Based on the control block 320, the memory management logic 310 determines which of the memory pages 315 that are not locked have appropriately sized memory blocks 330. Once a memory page is found that has appropriate sized memory blocks 330, that memory page may be locked. The memory management logic 310 may then examine the metadata structure 327 at the beginning of the identified memory pages 315 and/or arenas to determine whether those memory pages 315 have unallocated memory blocks 330. When unallocated memory blocks 330 are found, they are allocated to a requester (e.g., thread, operating system, application, etc.), and the metadata structure 327 (e.g., bitmap) is updated. The lock on the memory page may then be released.

If the memory management logic 310 fails to find a memory page that has appropriate memory blocks, an unmanaged memory page may be initialized. To initialize a memory page, the memory management logic 310 may generate a new arena for the memory page, and divide the arena into multiple evenly sized blocks, each block having a size equal to the size of the data that will be written to the memory page and/or arena. A metadata structure may then be generated at the beginning of the memory page. The metadata structure may include one or more of the metadata structure elements discussed with reference to FIG. 3B. One or more of the memory blocks are then allocated, and the metadata structure is updated. Once the memory page has been initialized, the control block 320 may also be updated to show the newly initialized memory page.

Some memory block sizes are used more frequently than others. Examples of common block sizes include 1, 2, 4, 8, 16, 24, 32, 40, 48 and 64 bytes. For these commonly used memory block sizes, memory pages 315 may be pre-loaded. A pre-loaded memory page is a memory page that may be initialized automatically when certain conditions occur. For example, a pre-loaded memory page may be initialized when an application is run.

In one embodiment, information for pre-loaded memory pages is stored in the general purpose memory allocation library. Therefore, as a process is read into memory at runtime, pre-loaded memory pages may be generated. In one embodiment, memory pages for each of the common memory block sizes are initialized at this time, as well as a control block. Alternatively, just the control block or pointer arrays for the memory pages are set up and allocated, and the actual memory pages are initialized as needed.

When the memory management logic 310 receives a request to free a memory block having a particular address, a check is made to determine whether the address received corresponds to an arena accessible from the control block, and that it corresponds to an address of one of the blocks in the arena. The memory management logic 310 may calculate the appropriate arena address, and then examine the metadata structure 327 (e.g., the signature value) to determine whether one or more memory blocks should be freed. If the arena is the same size as the memory page on which it resides, calculating the address of the memory page may be accomplished using a simple masking operation. To perform the masking operation, the lowest bits in the address are zeroed out, and the upper bits are read to determine the address of the page. If, for example, the signature value indicates that the free request is valid, then the upper bits may be zeroed out, and an offset from the beginning of the page to the beginning of the memory block may be determined. An appropriate bit in the bitmap may then be set to indicate that the corresponding memory block is no longer allocated. Other appropriate metadata may also be updated (e.g., a number of allocated blocks value). Thus, memory can be freed quickly and efficiently.

The memory management logic 310 may further be configured to lock and unlock memory pages 315 to specific threads and/or programs. Multiple types of locks may be employed by the memory management logic 310, examples of which include a read/write lock, a mutual exclusion lock, or any other type of lock or structure that indicates that a page is busy, unavailable, or being used by a thread, application or operating system Individual memory pages 315 may be locked and unlocked as appropriate to prevent two requesters from modifying metadata in the same arena at the same time. This may reduce program crashes without requiring multiple threads to wait for one thread to complete a memory allocation, and without requiring significant portions of memory to be locked at a time.

Figure 3B:
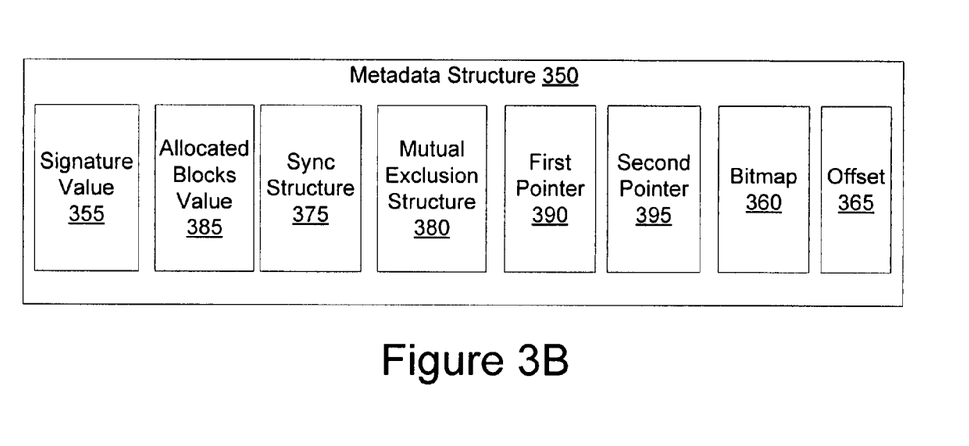
FIG. 3B illustrates a block diagram of a metadata structure, in accordance with one embodiment of the present invention.

FIG. 3B illustrates a block diagram of a metadata structure 350, in accordance with one embodiment of the present invention. The metadata structure 350 may be situated at a beginning of an arena, and contain information pertaining to memory blocks of the arena. In one embodiment, the metadata structure 350 is the metadata structure 327 of FIG. 3A.

Referring to FIG. 3B, in one embodiment, the metadata structure 350 includes a bitmap 360. The bitmap 360 may have as many bits as there are blocks in the memory page, and each bit in the bitmap 360 may represent one of the memory blocks. If a bit has a first value (e.g., a 1), then the corresponding memory block is free (unallocated). If the bit has a second value (e.g., a 0), then the corresponding memory block has been allocated. The size of each memory block can be determined based on the number of bits in the bitmap 360, since the size of the arena is known, and since the arena is equally divided into the memory blocks. This same information can also be used to deduce the starting location (e.g., offset from beginning of memory page) of each memory block. Therefore, in one embodiment, only a single bit is required to control the allocation of, and to otherwise manage, a single memory block. This may reduce overhead associated with managing memory allocations.

In one embodiment, the metadata structure 350 includes a signature value 355. The signature value 355 indicates that the memory page is a managed memory page. In one embodiment, the signature value also identifies the size of the blocks within the memory page. Such signature values may allow the memory pages to be quickly scanned to determine which, if any, may have memory blocks appropriate to a specific memory allocation request.

In one embodiment, the metadata structure 350 includes at least one of a synchronization structure 375 and a mutual exclusion structure 380. These structures may lock the memory page to particular requesters, which may protect memory blocks from being freed inappropriately, or being allocated to multiple requesters. In one embodiment, the synchronization structure 375 and the mutual exclusion structure 380 lock only the metadata structure 350. This ensures that no new allocations may be made to any thread other than the thread to which the memory page is locked. At the same time, threads, applications, and operating systems that have already been allocated memory blocks within a memory page are allowed to continue to access those memory blocks, even while the memory page is locked to another requster.

In one embodiment, the metadata structure 350 includes an allocated blocks value 385 that identifies the number of blocks that have been allocated on the memory page. The allocated blocks value 385 may also indicate the number of free (unallocated) blocks on the memory page.

In one embodiment, the allocated blocks value 385 identifies the number of bytes and/or words that are included in the bitmap. Bitmaps may be sized such that they satisfy memory alignment constraints. This may result in bitmaps having more bits than there are memory blocks in the arena. In such an instance, the allocated blocks value 385 may also identify the number of valid bits at the end of the bitmap. For example, if a word size is 32 bits, a bitmap may have a size of 4 words, where the last word contains only 21 valid bits. Therefore, the allocated blocks value 385 may indicate which bits in the bitmap should not be considered for allocation. Alternatively, these bits may be set to the value for an allocated block (e.g. 0), ensuring that they will not be considered during allocation.

In one embodiment, the metadata structure 350 includes a first pointer 390 that points to a value in a control block. The value in the control block may be a lock that enables the memory page to be locked as necessary. The value in the control block may also indicate whether the memory page has been locked.

In one embodiment, the metadata structure 350 includes a second pointer 395 that points to another memory page that includes an arena divided into memory blocks of the same size as those in the current memory page. Therefore, when all of the memory blocks in the current memory page are allocated, memory blocks in the memory page to which the pointer points may be allocated.

In one embodiment, the metadata structure 350 includes offset information 365 from the beginning of the memory page to the first memory block. Alternatively, the metadata structure 350 may include a pointer to the beginning of the first memory block. The offset 365 or pointer may be used to determine an actual location for the beginning of each of the memory blocks within a memory page.

The metadata structure 350 may include some or all of the signature value 355, allocated blocks value 385, synchronization structure 375, mutual exclusion structure 380, first pointer 390, second pointer 395, bitmap 360 and offset 365. These metadata structure elements may be arranged in the order illustrated, or other arrangements may be used.

Figure 4A:
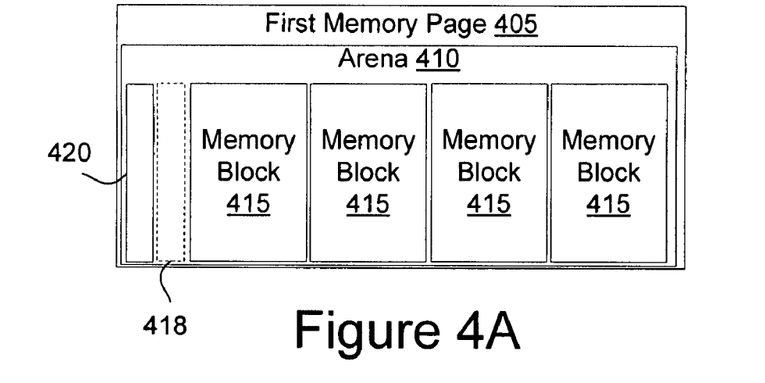
FIG. 4A illustrates a block diagram of an exemplary managed memory page, in accordance with one embodiment of the present invention.
Figure 4B:
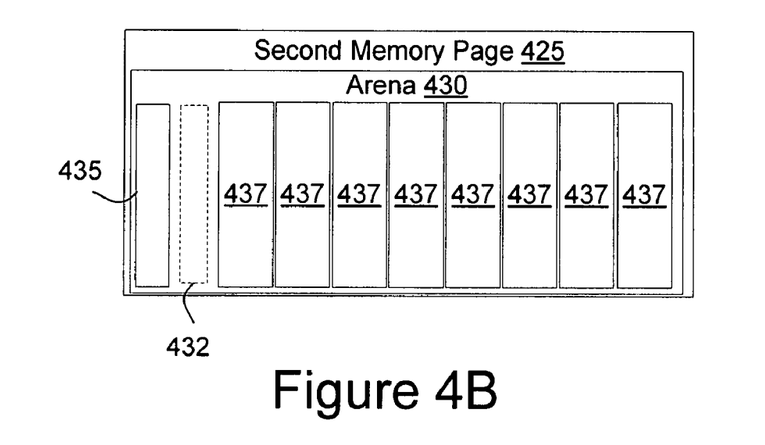
FIG. 4B illustrates a block diagram of another exemplary managed memory page, in accordance with one embodiment of the present invention.
Figure 4C:
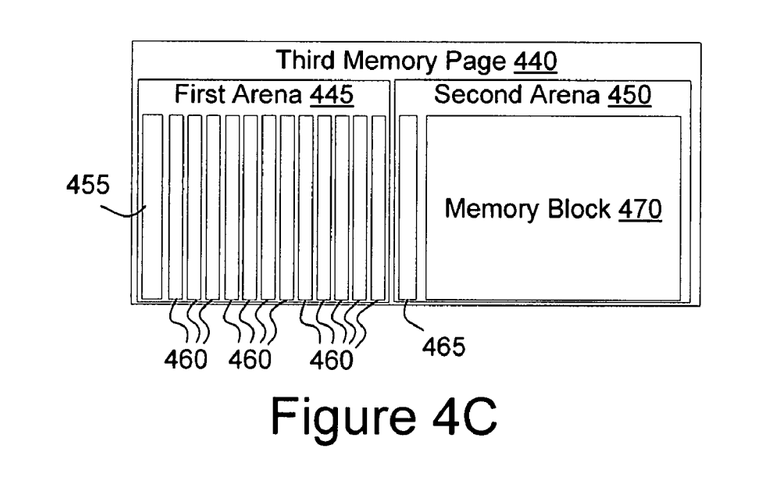
FIG. 4C illustrates a block diagram of another exemplary managed memory page, in accordance with one embodiment of the present invention.

FIGS. 4A-4C illustrate block diagrams of exemplary managed memory pages, in accordance with embodiments of the present invention. Referring to FIG. 4A, a first memory page 405 is shown. The first memory page 405 includes an arena 410 that has a size approximately equal to a size of the memory page 405. The arena 410 is divided into multiple memory blocks 415 of equal size, and further includes a metadata structure 420.

The arena 410 may also include an alignment block 418 between the metadata structure 420 and the first memory block. The alignment block 418 is a region of memory within the arena 410 that is not available for allocation, and whose placement and size ensures that the memory blocks 415 are memory aligned. Once the arena 410 has been divided into equal sized memory blocks 415, any remainder may be included in alignment block 418. In one embodiment, alignment block 418 is smaller than a memory block.

As illustrated, the arena 410 is divided into four equally sized memory blocks 415. If, for example, the first memory page 405 has a capacity of 4 kB, then each of the memory blocks 415 may have a capacity of approximately 1 kB. The metadata structure 420 would therefore have a bitmap with four bits, one for each of the four memory blocks 415. If the arena 410 were divided into four 1000 byte memory blocks 415, then alignment block 418 would have a size of approximately 10-70 bytes, which comprises a portion of the remaining memory not used by the metadata structure 420.

FIG. 4B shows a second memory page 425, in accordance with one embodiment of the present invention. The second memory page 425 includes an arena 430 that has a size approximately equal to a size of the memory page 425. The arena 430 is divided into multiple memory blocks 437 of equal size, and further includes a metadata structure 435 and an alignment block 432. As illustrated, the arena 430 is divided into eight equally sized memory blocks 437. If, for example, the second memory page 425 has a capacity of 4 kB, then each of the memory blocks 415 may have a capacity of approximately 512 bytes. The metadata structure 435 would therefore have a bitmap with eight bits, one for each of the eight memory blocks 415.

FIG. 4C shows a third memory page 440, in accordance with one embodiment of the present invention. The third memory page 440 includes a first arena 445 and a second arena 450. The first arena 445 and second arena 450 have a combined size approximately equal to a size of the third memory page 440. The first arena 445 is divided into multiple first memory blocks 460 of equal size, and further includes a first metadata structure 455. The second arena 450 is divided into a single memory block 470, and further includes a second metadata structure 265. Though third memory page 240 is divided into two separate arenas, more or fewer arenas may be used. The separate arenas may be sized equally, or they may have different sizes.

Figure 5:
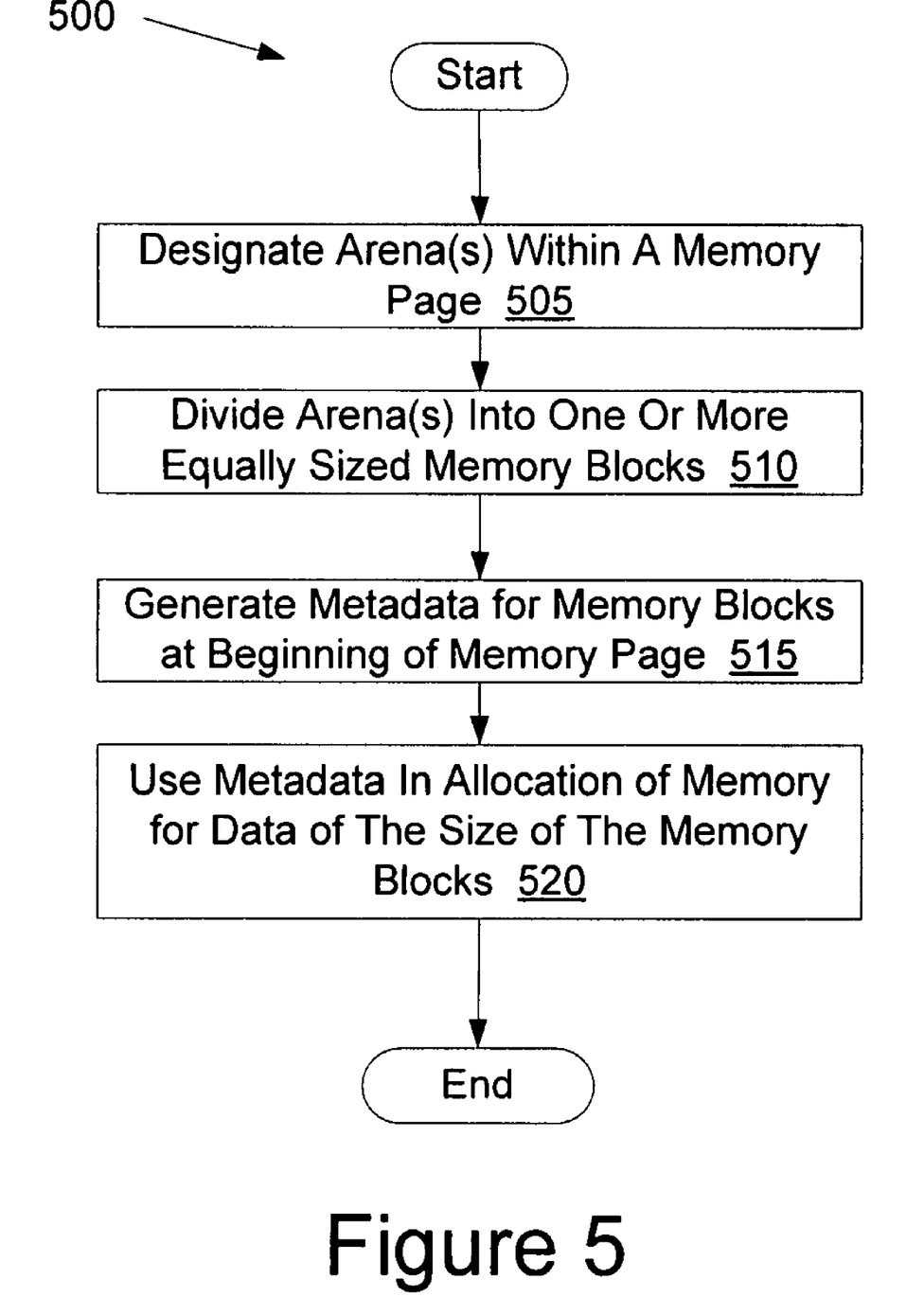
FIG. 5 illustrates a flow diagram of one embodiment for a method of initializing a memory page.

FIG. 5 illustrates a flow diagram of one embodiment for a method 500 of initializing a memory page. The method may be performed by processing logic that may comprise hardware (e.g., circuitry, dedicated logic, programmable logic, microcode, etc.), software (such as instructions run on a processing device), or a combination thereof. In one embodiment, method 500 is performed by apparatus 305 of FIG. 3.

Method 500 may be performed upon a request by a thread, program, or operating system for a memory allocation. Method 500 may also be performed as a program or thread is started up.

Referring to FIG. 5, method 500 begins with processing logic designating one or more arenas within a memory page (block 505). At block 510, each of the one or more arenas are divided into one or more equally sized memory blocks. In one embodiment, the size of the memory blocks is determined based on the size of data that is to be written to the memory page. For example, if 500 bytes of data are to be allocated, then the memory page may be divided into 500 byte blocks. Alternatively, the size of the memory blocks may be dictated by a general purpose memory allocation library.

At block 515, metadata is generated for the memory blocks at the beginning of the memory page. In one embodiment, the metadata is generated at the beginning of each of the one or more arenas. Alternatively, the metadata may be generated at any fixed location within the memory page or external to the memory page such that it is not between memory blocks. The metadata may be data that describes and/or keeps track of the memory blocks and the data in the memory blocks. In one embodiment, the metadata includes a signature value that identifies whether the memory page is being managed. In one embodiment, the metadata includes a bitmap, each bit in the bitmap corresponding to one of the memory blocks in the memory page. Metadata may also include other information, as described in more detail with reference to FIG. 3B.

At block 520, the metadata is used in the allocation of memory for data of the size of the memory blocks. In one embodiment, the signature value is examined to determine that the block sizes are appropriately sized for the data, and the bitmap is used to determine which memory block to allocate. The bitmap may then be updated to reflect the newly allocated memory block.

Figure 6A:
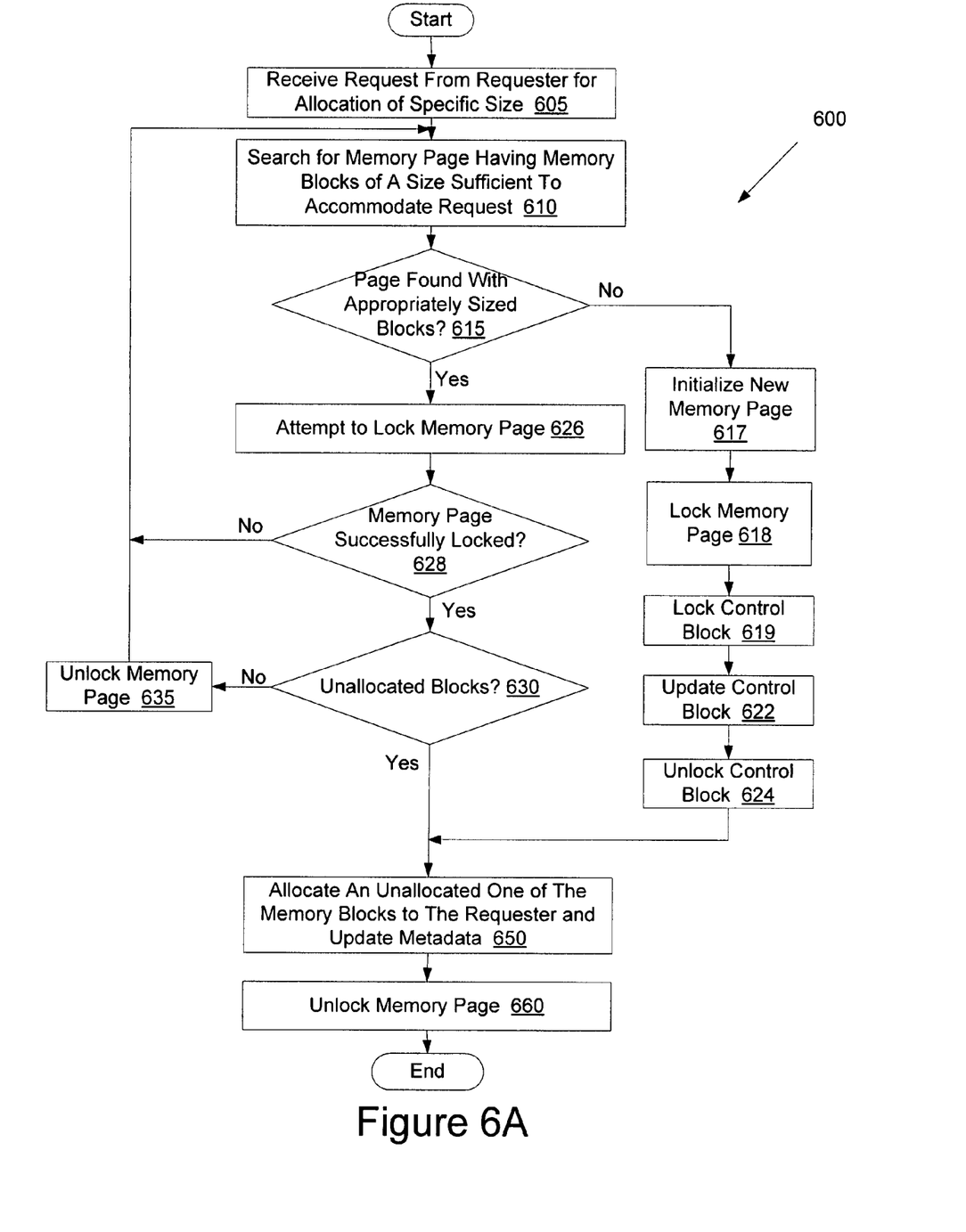
FIG. 6A illustrates a flow diagram of one embodiment for another method of managing memory allocation.

FIG. 6A illustrates a flow diagram of one embodiment for a method 600 of managing memory allocation. The method may be performed by processing logic that may comprise hardware (e.g., circuitry, dedicated logic, programmable logic, microcode, etc.), software (such as instructions run on a processing device), or a combination thereof. In one embodiment, method 600 is performed by the apparatus 305 of FIG. 3A. It should be noted that though method 600 is discussed with reference to searching for, and making allocations from, specific memory pages, method 600 may equally be applied to searching for, and allocating memory from, specific arenas. Those specific arenas may be located within memory pages.

Referring to FIG. 6A, method 600 begins with processing logic receiving a request from a requester for a memory allocation of a specific size (block 605). The requester may be an operating system, a thread, or an application.

At block 610, the processing logic searches for a memory page having memory blocks of a size sufficient to accommodate the request. In one embodiment, searching for the memory page includes searching through a control block.

At block 615, the processing logic determines whether a memory page has been found with appropriately sized memory blocks. In one embodiment, an appropriately sized memory block is a memory block having a size that is approximately equal to, but not smaller than, the requested size. Alternatively, an appropriately sized memory block may have any size that is not smaller than the requested size. If no memory pages are found with appropriately sized memory blocks, the method proceeds to block 617. If a memory page is found with appropriately sized memory blocks, the method proceeds to block 626.

At block 626, processing logic attempts to lock the memory page. The lock can be a read/write lock, a mutual exclusion lock, or any other type of lock known in the art. At block 628, processing logic determines whether the lock was successfully performed. If the memory page was not successfully locked, the method proceeds to block 610, and another search is performed to find a different memory page with appropriately sized memory blocks.

If the memory page is successfully locked, the method proceeds to block 630. At block 630, processing logic determines whether the memory page has any unallocated blocks. If the memory page does have unallocated blocks, then the method proceeds to block 650. If the memory page does not have unallocated blocks, the method proceeds to block 635.

At block 635, the memory page is unlocked. The process then proceeds to block 610, and a search is performed to determine whether there are any other memory pages having blocks of a sufficient size to accommodate the request.

At block 617, processing logic initializes a new memory page. Initializing a new memory page may include finding an unmanaged memory page, designating an arena within the memory page, dividing the arena into one or more equally sized memory blocks, and generating metadata for the memory blocks (at the beginning of the memory page or elsewhere).

At block 618, the new memory page is locked to the requester. The lock can be a read/write lock, a mutual exclusion lock, or any other type of lock known in the art. In one embodiment, the new memory page is locked to the requester when it is initialized.

At block 619, a control block is locked. If the control block is already locked, processing logic may wait for the control block to become unlocked. In one embodiment, a new thread is generated, and the new thread waits for the control block to become unlocked. Once the control block becomes unlocked, it is locked by processing logic. This ensures that the control block will be updated by only one requester at a time. In one embodiment, the lock only locks other requesters from writing to the control block. Therefore, even when the control block is locked, other requesters can still read from it.

At block 622, the control block is updated to reflect the newly initialized memory page. This may include updating metadata of the control block, adding an entry to the control block indicating the address of the newly initialized memory page, and indicating a size of memory blocks within the memory page, etc. The control block is then unlocked at block 624. The method then continues to block 650.

At block 650, an unallocated one of the memory blocks are allocated to the requester, and metadata is updated in the memory page to reflect the newly allocated block.

At block 660, the page is unlocked. Once the page is unlocked, it is available for other requesters to lock, which they must do before they examine or update the metadata.

Figure 6B:
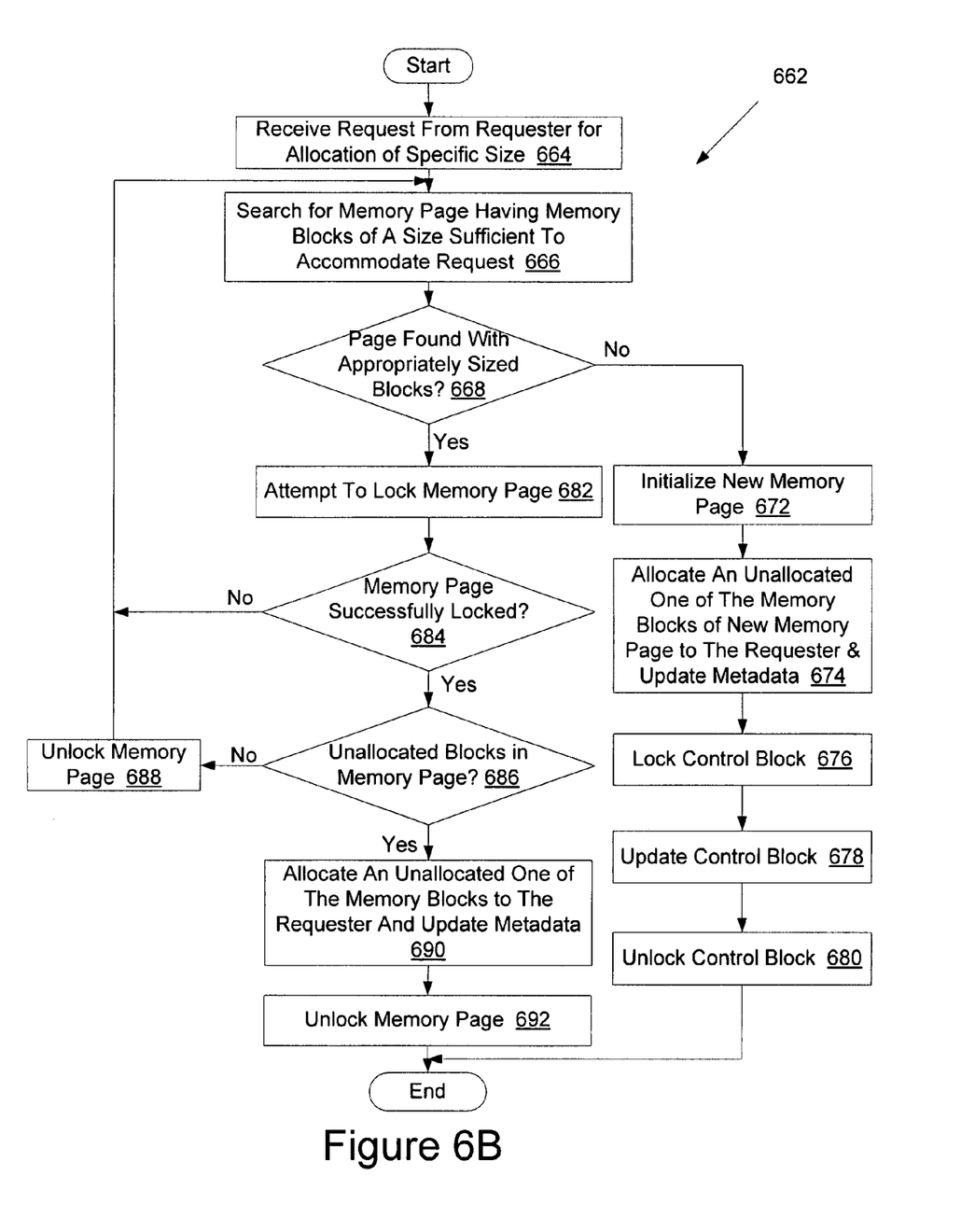
FIG. 6B illustrates a flow diagram of another embodiment for a method of managing memory allocation.

FIG. 6B illustrates a flow diagram of another embodiment for a method 662 of managing memory allocation. The method may be performed by processing logic that may comprise hardware (e.g., circuitry, dedicated logic, programmable logic, microcode, etc.), software (such as instructions run on a processing device), or a combination thereof. In one embodiment, method 662 is performed by the apparatus 305 of FIG. 3A. Though method 662 is discussed with reference to searching for, and making allocations from, specific memory pages, method 662 may equally be applied to searching for, and allocating from, specific arenas. Those specific arenas may be located within memory pages.

Referring to FIG. 6B, method 662 begins with processing logic receiving a request from a requester (e.g., a thread, operating system, or application) for a memory allocation of a specific size (block 664). At block 666, the processing logic searches for a memory page having memory blocks of a size sufficient to accommodate the request. In one embodiment, searching for the memory page includes searching through a control block.

At block 668, the processing logic determines whether a memory page has been found with appropriately sized memory blocks. If such a memory page is identified, the method proceeds to block 682. If no memory page with appropriately sized blocks is identified, the method continues to block 672.

At block 672, processing logic initializes a new memory page. At block 674, an unallocated one of the memory blocks of the new memory page is allocated to the requester, and metadata on the new memory page is updated. At block 676, a control block is locked. The control block is then updated to reflect the newly initialized memory page (block 678). Once updated, the control block is unlocked (block 680). The method then ends.

At block 682, processing logic attempts to lock the memory page to the requester. At block 684, processing logic determines whether the lock was successful. If the lock was not successful, the method proceeds to block 666. If the lock was successful, the method proceeds to block 686.

At block 686, processing logic determines whether the memory page has unallocated memory blocks. This may be done by examining a metadata structure of the memory page. If the memory page does have unallocated memory blocks, the method proceeds to block 690. If the memory page does not have unallocated memory blocks the method proceeds to block 688.

At block 688, the memory page is unlocked. The method then proceeds to block 666 to search for another memory page.

At block 690, an unallocated one of the memory blocks are allocated to the requester, and metadata on the memory page is updated. At block 692, the page is unlocked. The method then ends.

Figure 7:
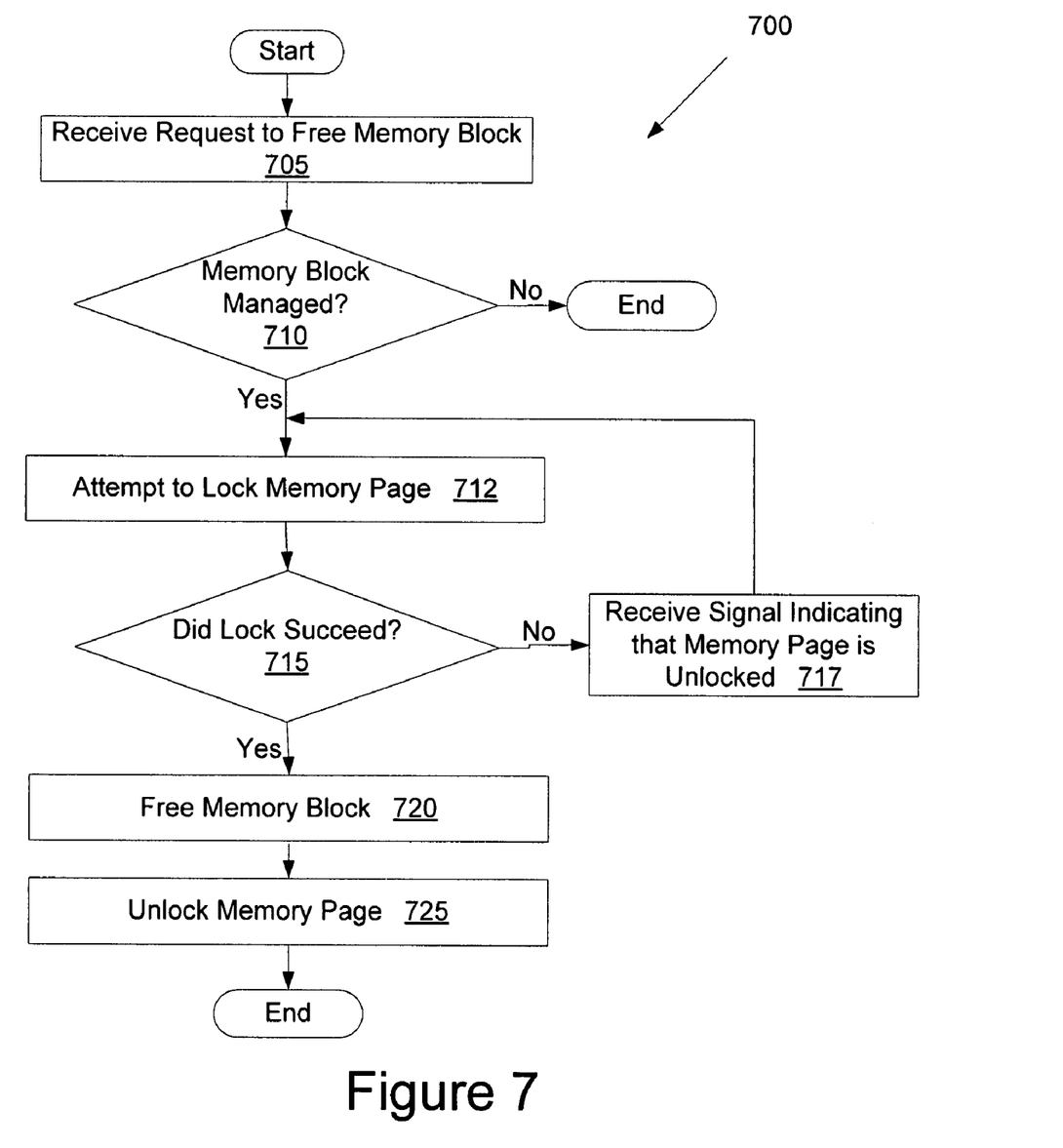
FIG. 7 illustrates a flow diagram of one embodiment for a method of freeing allocated memory.

FIG. 7 illustrates a flow diagram of one embodiment for a method 700 of freeing allocated memory. The method may be performed by processing logic that may comprise hardware (e.g., circuitry, dedicated logic, programmable logic, microcode, etc.), software (such as instructions run on a processing device), or a combination thereof. In one embodiment, method 700 is performed by the apparatus 305 of FIG. 3A.

Referring to FIG. 7, method 700 begins with processing logic receiving a request from a requester (e.g., a thread, operating system, or application) to free a memory block (block 705). Processing logic then determines whether the memory block is being managed (block 710). This determination may include examining a control block and/or examining metadata within a memory page on which the memory block resides. One way to quickly make this determination is by performing a masking operation.

At block 712, processing logic attempts to lock the memory page. At block 715, processing logic determines whether the memory page was successfully locked. If the memory page was successfully locked, the method proceeds to block 720. If the memory page was not successfully locked, the method proceeds to block 717. The memory page is not successfully locked, for example, when it is already locked to another requester.

At block 717, the requester waits until a signal is received indicating that the memory page is unlocked, after which the method proceeds to block 712, and another attempt is made to lock the memory page. Alternatively, the requester may wait a specified amount of time, after which the method may proceed to block 712. In one embodiment, if the memory page cannot be immediately locked, a new thread is generated to wait for the lock, and to eventually free the memory block. The original requester then is not delayed by waiting for the memory page to become lockable.

At block 720, the memory block is freed. Freeing the memory block may include changing the value of a bit in a bitmap to indicate that the corresponding memory block is unallocated, and updating other metadata. Other metadata that may be updated include a free block count, an allocated block count, and the block number of the last block to be freed. At block 725, the memory page is unlocked, at which point the method ends.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
designating one or more arenas within a managed memory page by a computing device executing a memory management logic, the managed memory page being a segment of main memory, wherein the one or more arenas are bounded by the managed memory page;
dividing at least one of the arenas into two or more memory blocks having the same fixed size upon initializing the managed memory page;
generating metadata for the two or more memory blocks at a location other than between the memory blocks, wherein no metadata for the memory blocks is located between the memory blocks within the at least one arena that is bounded by the managed memory page; and
using the metadata when allocating memory to satisfy an allocation request of the size of the memory blocks.

2. The method of claim 1, wherein the metadata comprises a bitmap, each bit in the bitmap corresponding to a different one of the memory blocks and identifying whether the corresponding memory block is allocated.

3. The method of claim 1, wherein the metadata comprises a signature value, the signature value indicating that the memory page is a managed memory page.

4. The method of claim 1, wherein the metadata comprises a pointer to at least one additional memory page that includes additional memory blocks having a size approximately equal to the size of the memory blocks.

5. The method of claim 1, further comprising:
generating a control block, the control block including the size of the memory blocks in the memory page and a pointer to the memory page.

6. The method of claim 1, further comprising:
locking the memory page to one of a plurality of requesters.

7. The method of claim 1, wherein the size and location of the memory blocks can be determined based on addresses of the memory blocks and on the metadata.

8. The method of claim 1, further comprising:
receiving the allocation request from a requester;
locking the memory page to the requester;
allocating an unallocated one of the memory blocks to the requester;
updating the metadata; and
unlocking the memory page.

9. The method of claim 1, further comprising:
using the metadata when freeing the memory blocks.

10. A method, comprising:
receiving a memory allocation request from a requester, the request indicating a size smaller than a memory page;
determining whether there is a managed memory page that includes an arena that has been divided into one or more fixed size memory blocks having approximately the requested size, wherein the arena is bounded by the managed memory page;
upon identifying the managed memory page that includes an arena that has been divided into memory blocks having approximately the requested size, locking the memory page to the requester;
allocating a memory block to the requester from the arena in the memory page;

updating metadata stored on the memory page, wherein no metadata for the memory blocks is located between the memory blocks; and unlocking the memory page.

11. The method of claim 10, wherein the requester is one of a thread, operating system or application.

12. The method of claim 10, wherein the metadata comprises at least one of a bitmap, a signature value, a first pointer and a second pointer, wherein each bit in the bitmap corresponds to a different one of the memory blocks and identifies whether the corresponding memory block is allocated, the signature value indicates that the memory page is a managed memory page, the first pointer points to at least one additional memory page that includes additional memory blocks having a size approximately equal to the size of the memory blocks, and the second pointer points to a lock on a control block.

13. The method of claim 10, further comprising:

when there are no managed memory pages that include an arena that has been divided into one or more fixed size memory blocks having approximately the requested size, performing the following:

transforming an unmanaged memory page into a managed memory page;

generating one or more arenas for the transformed memory page, the one or more arenas being bounded by the transformed memory page;

dividing at least one of the one or more arenas in the transformed memory page into a plurality of fixed size memory blocks having approximately the requested size; and locking the transformed memory page to the requestor.

14. An apparatus, comprising:

a main memory that is logically divided into a plurality of memory pages, at least one memory page having at least one arena within the memory page that is bounded by the memory page, two or more equally sized memory blocks that divide the arena that were generated upon initialization of the at least one memory page, and metadata for the memory blocks, the metadata not being located between the two or more memory blocks, wherein no metadata for the memory blocks is located between the memory pages within the at least one arena; and a memory management logic, configured to allocate memory to satisfy an allocation request of the size of the memory blocks, and to use the metadata when allocating memory.

15. The apparatus of claim 14, further comprising:

a control block, including pointers to each of the memory pages and identifying the size of the memory blocks in each of the memory pages; and the memory management logic configured to use the control block to determine one of the plurality of memory pages from which to allocate memory to satisfy the allocation request.

16. The apparatus of claim 14, wherein the memory management logic is configured to search for a memory page having memory blocks of a size indicated by the allocation request, and to initiate such a memory page if none is found.

17. The apparatus of claim 14, wherein the metadata includes at least one of a bitmap and a signature value, each bit in the bitmap corresponding to a different one of the memory blocks and identifying whether the corresponding memory block is allocated, and the signature value indicating that the memory page is a managed memory page.

18. The apparatus of claim 14, wherein the memory management logic is configured to lock one or more of the memory pages to a requester.

19. A machine-accessible medium including data that, when accessed by a machine, cause the machine to perform a method comprising:

designating one or more arenas within a managed memory page by a computing device executing a memory management logic, the managed memory page being a segment of main memory, wherein the one or more arenas are bounded by the managed memory page;

dividing at least one of the arenas into two or more memory blocks having the same fixed size upon initializing the managed memory page;

generating metadata for the two or more memory blocks at a location other than between the memory blocks, wherein no metadata for the memory blocks is located between the memory blocks within the at least one arena that is bounded by the managed memory page; and using the metadata when allocating memory to satisfy an allocation request of the size of the memory blocks.

20. The machine-accessible medium of claim 19, wherein the metadata comprises at least one of a bitmap, a signature value, a first pointer and a second pointer, wherein each bit in the bitmap corresponds to a different one of the memory blocks and identifies whether the corresponding memory block is allocated, the signature value indicates that the memory page is a managed memory page, the first pointer points to at least one additional memory page that includes additional memory blocks having a size approximately equal to the size of the memory blocks, and the second pointer points to a lock on a control block.

21. The machine-accessible medium of claim 19, the method further comprising:

generating a control block, the control block identifying a pointer to the memory page and the size of the memory blocks in the memory page, and including a lock indicator that shows whether the memory page is locked to a requester.

22. The machine-accessible medium of claim 19, the method further comprising:

locking the memory page to one of a plurality of threads.

23. The machine-accessible medium of claim 19, the method further comprising:

receiving the allocation request from a requester;

locking the memory page to the requester;

allocating an unallocated one of the memory blocks to the requester;

updating the metadata; and unlocking the memory page.

* * * * *